United States Patent
Larson et al.

(10) Patent No.: US 8,144,232 B2
(45) Date of Patent: Mar. 27, 2012

(54) CAMERA SYSTEM AND METHOD FOR PICTURE SHARING USING GEOTAGGED PICTURES

(75) Inventors: Erik Larson, Malmo (SE); Julia Wilson, Malmo (SE); Fredrik Alstorp, Bunkeflostrand (SE)

(73) Assignee: Sony Ericsson Mobile Communications AB, Lund (SE)

( * ) Notice: Subject to any disclaimer, the term of this patent is extended or adjusted under 35 U.S.C. 154(b) by 616 days.

(21) Appl. No.: 12/167,467

(22) Filed: Jul. 3, 2008

(65) Prior Publication Data
US 2010/0002122 A1    Jan. 7, 2010

(51) Int. Cl.
H04N 5/222 (2006.01)
H04N 5/262 (2006.01)
G03B 17/00 (2006.01)
G06K 9/32 (2006.01)

(52) U.S. Cl. .............. 348/333.05; 348/333.01; 348/239; 396/87; 396/88; 382/294

(58) Field of Classification Search ............. 348/333.05, 348/143, 164; 396/322
See application file for complete search history.

(56) References Cited

U.S. PATENT DOCUMENTS

| | | | |
|---|---|---|---|
| 7,397,501 B2* | 7/2008 | Afsenius | 348/218.1 |
| 2003/0210806 A1 | 11/2003 | Yoichi et al. | |
| 2006/0004512 A1* | 1/2006 | Herbst et al. | 701/208 |
| 2006/0089792 A1 | 4/2006 | Manber et al. | |
| 2006/0238617 A1 | 10/2006 | Tamir | |
| 2006/0271286 A1 | 11/2006 | Rosenberg | |
| 2007/0025723 A1 | 2/2007 | Baudisch et al. | |
| 2007/0030363 A1* | 2/2007 | Cheatle et al. | 348/239 |
| 2009/0015702 A1* | 1/2009 | Garcia Alonso | 348/333.02 |
| 2009/0160946 A1* | 6/2009 | Hijikata et al. | 348/207.2 |
| 2009/0175609 A1* | 7/2009 | Tan | 396/77 |

OTHER PUBLICATIONS

International Search Report and Written Opinion from corresponding International Application No. PCT/IB08/003495.
International Preliminary Report on Patentability from corresponding International Application No. PCT/IB08/003495.

* cited by examiner

*Primary Examiner* — David Ometz
*Assistant Examiner* — Quang Le
(74) *Attorney, Agent, or Firm* — Renner, Otto, Boisselle & Sklar, LLP

(57) ABSTRACT

A system and method provide interactive techniques for sharing digital photos, in which a user of a portable electronic device may seek out a location at which another electronic device was used to capture a photo. The captured image may then be displayed on a display of the user's electronic device by superimposing the photo on the display while the display functions as an electronic viewfinder for a camera assembly of the electronic device. The viewing of another person's photos is made to be an interactive and entertaining experience. The disclosed techniques combine the user's "real world" presence (e.g., location and viewing perspective) with the previously captured photo to create a fun and exciting experience that also may serve as a trigger for communication between the user and the person who took the photo.

12 Claims, 5 Drawing Sheets

CAMERA SYSTEM AND METHOD FOR PICTURE SHARING USING GEOTAGGED PICTURES

TECHNICAL FIELD OF THE INVENTION

The technology of the present disclosure relates generally to photography and, more particularly, to a camera system and method that allows a user of a first electronic device to display an image that was captured by a second electronic device when the first electronic device is positioned in a manner that corresponds to the position of second electronic device when the image was captured.

BACKGROUND

Mobile and/or wireless electronic devices are becoming increasingly popular. For example, mobile telephones, portable media players and portable gaming devices are now in wide-spread use. In addition, the features associated with certain types of electronic devices have become increasingly diverse. For example, many mobile telephones now include cameras that are capable of capturing still images and video images. Some of these cameras are capable of taking relatively high quality pictures. Time and date information also may be stored with captured photos so that the photos may be retrieved by when the photos was taken.

Also, many electronic devices that include imaging devices also include location determining technology, such as global positioning system (GPS) positioning technology. Using location information that is determined at the time an image was captured allows the image to be "geotagged" with the location information. This allows the user to retrieve photos by where the photo was taken. In some devices, a user may be able to view the captured photos in conjunction with a map application. There still remains, however, room for improvement in the manner that geotagged photographs may be used to enhance a user's experience with a portable electronic device.

SUMMARY

To provide an interactive way of sharing digital photos, the present disclosure describes a system and method that allows a user of a portable electronic device to seek out a location at which another electronic device was used to capture a photo. The captured image may then be displayed on a display of the user's electronic device. In one embodiment, the photo is superimposed on the display while the display functions as an electronic viewfinder for a camera assembly of the electronic device. As will be described, the disclosed techniques may make viewing of another person's photos an interactive and entertaining experience. The disclosed techniques combine the user's "real world" presence (e.g., location and viewing perspective) with the previously captured photo to create a fun and exciting experience that also may serve as a trigger for communication between the user and the person who took the photo.

According to one aspect of the disclosure, an electronic device includes a camera assembly; an electronic viewfinder configured to display a preview image representing a portion of a scene that is in a field of view of the camera assembly to a user; and a controller that controls the electronic viewfinder to display a photo together with the preview image, the photo containing a representation of a portion of the scene as captured at a previous point in time.

According to one embodiment of the electronic device, the photo is captured with a different camera assembly and transferred to the electronic device.

According to one embodiment of the electronic device, the photo is superimposed over the preview image.

According to one embodiment of the electronic device, the photo is displayed with partial transparency.

According to one embodiment, the electronic device further includes call circuitry for establishing a call over a network.

According to one embodiment of the electronic device, the photo is displayed when a location of the camera assembly comes within a predetermined distance of a location at which the photo was captured.

According to one embodiment of the electronic device, the photo is displayed on the viewfinder to visually represent a relative orientation of the scene as captured in the photo versus a point-of-view of the camera assembly with respect to the scene.

According to another aspect of the disclosure, a method of viewing a photo with an electronic device that includes a camera assembly and an electronic viewfinder includes displaying a preview image on the electronic viewfinder to a user, the preview image representing a portion of a scene that is in a field of view of the camera assembly; and displaying a photo on the electronic viewfinder together with the preview image, the photo containing a representation of a portion of the scene as captured at a previous point in time.

According to one embodiment of the method, the photo is captured with a different camera assembly and transferred to the electronic device.

According to one embodiment, the method further includes transmitting a notification to alert a user of the different camera assembly that the photo was viewed.

According to one embodiment, the method further includes receiving a communication from an electronic device associated with a user of the different camera assembly following the display of the photo.

According to one embodiment, the method further includes initiating a communication with an electronic device associated with a user of the different camera assembly following the display of the photo.

According to one embodiment of the method, the photo is superimposed over the preview image.

According to one embodiment of the method, the photo is displayed with partial transparency.

According to one embodiment, the method further includes tracking the location of the electronic device relative to a location at which the photo captured, and wherein the photo is displayed when a location of the camera assembly comes within a predetermined distance of the location at which the photo was captured.

According to one embodiment of the method, the photo is made available to the electronic device by a user of another electronic device.

According to one embodiment, the method further includes browsing a map that identifies locations of available photos, and wherein the location at which the photo was captured is a user selected one of the locations.

According to one embodiment, the method further includes receiving a notification that the electronic device is within a predetermined proximity to the location at which the photo was captured.

According to one embodiment, the method further includes outputting cues to the user to assist the user in moving to the location at which the photo was captured.

According to one embodiment of the method, the photo is displayed on the viewfinder to visually represent a relative orientation of the scene as captured in the photo versus a point-of-view of the camera assembly with respect to the scene.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
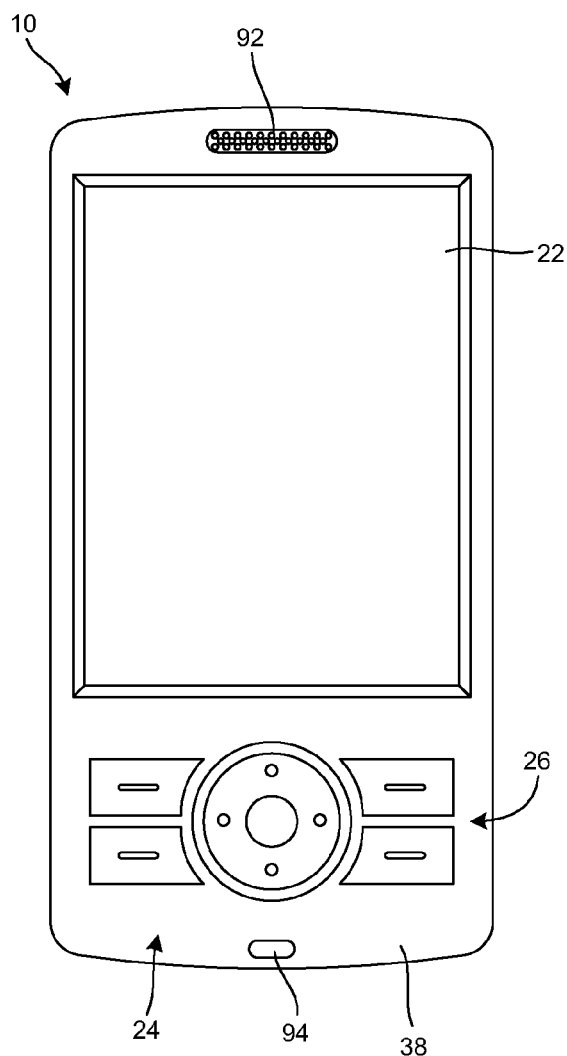
FIGS. 1 and 2 are respectively a front view and a rear view of an exemplary electronic device that includes a representative camera assembly.

Embodiments will now be described with reference to the drawings, wherein like reference numerals are used to refer to like elements throughout. It will be understood that the figures are not necessarily to scale.

Described below in conjunction with the appended figures are various embodiments of an improved system and method for sharing photos. In the illustrated embodiments, imaging devices that form part of the system for sharing photos are embodied as digital camera assemblies that are made part of respective mobile telephones. It will be appreciated that aspects of the disclosed system and method may be applied to other operational contexts such as, but not limited to, the use of dedicated cameras or another type of electronic devices that include a camera (e.g., personal digital assistants (PDAs), media players, gaming devices, computers, etc.). The described camera assemblies may be used to capture image data in the form of still images, also referred to as pictures, photographs and photos, but it will be understood that the camera assemblies may be capable of capturing video images in addition to still images.

Figure 2:
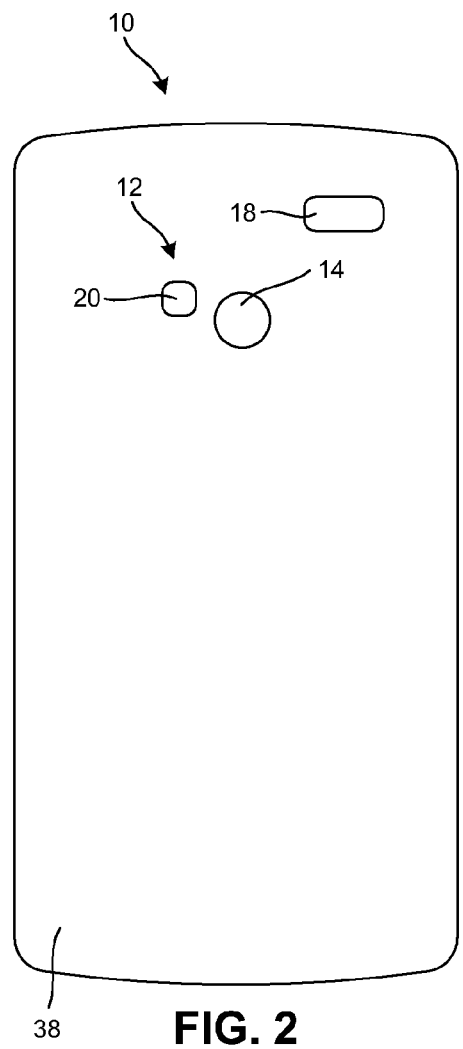
Figure 3:
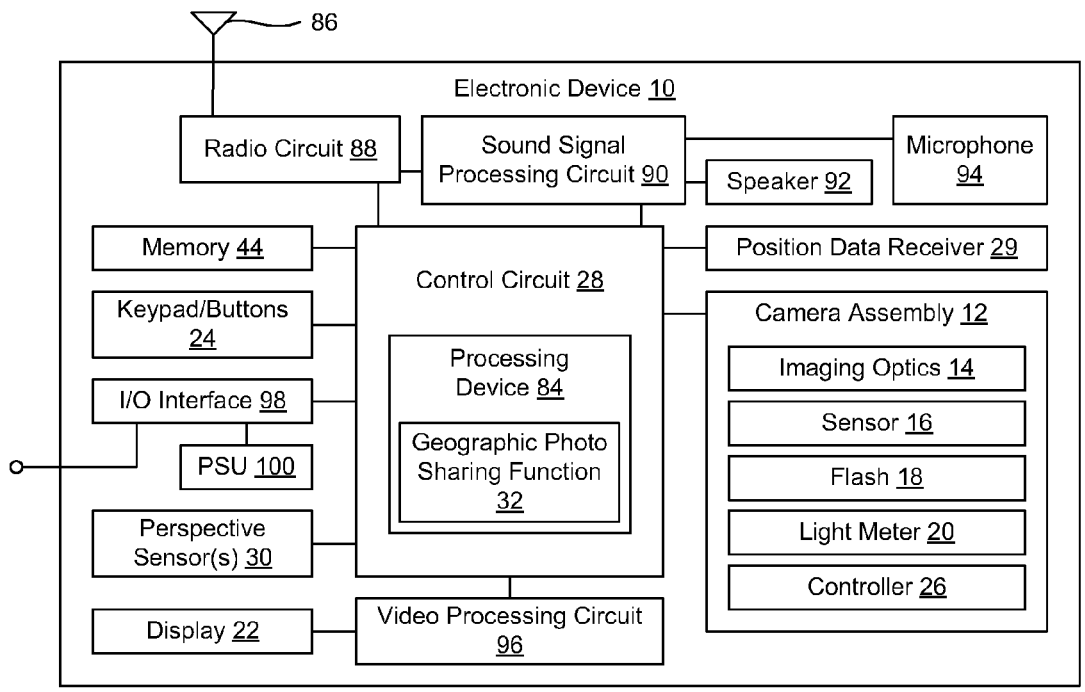
FIG. 3 is a schematic block diagram of the exemplary electronic device of FIGS. 1 and 2.

Referring initially to FIGS. 1 through 3, an electronic device 10 is shown. The illustrated electronic device 10 is a mobile telephone. The electronic device 10 includes a camera assembly 12 for taking digital still pictures and/or digital video clips. It is emphasized that the electronic device 10 need not be a mobile telephone, but could be a dedicated camera or some other device as indicated above.

The camera assembly 12 may be arranged as a typical camera assembly that includes imaging optics 14 to focus light from a portion of a scene that is within the field-of-view of the camera assembly 12 onto a sensor 16. The sensor 16 converts the incident light into image data. The imaging optics 14 may include various optical components, such as a lens assembly and components that supplement the lens assembly (e.g., a protective window, a filter, a prism, and/or a mirror). The imaging optics 14 may be associated with focusing mechanics, focusing control electronics, optical zooming mechanics, zooming control electronics, etc. Other camera assembly 12 components may include a flash 18 to provide supplemental light during the capture of image data for a photograph, a light meter 20, a display 22 for functioning as an electronic viewfinder and as part of an interactive user interface, a keypad and/or buttons 24 for accepting user inputs, an optical viewfinder (not shown), and any other components commonly associated with cameras. One of the keys or buttons 24 may be a shutter key that the user may depress to command the taking of a photograph.

Another component of the camera assembly 12 may be an electronic controller 26 that controls operation of the camera assembly 12. The controller 26 may be embodied, for example, as a processor that executes logical instructions that are stored by an associated memory, as firmware, as an arrangement of dedicated circuit components, or as a combination of these embodiments. Thus, methods of operating the camera assembly 12 may be physically embodied as executable code (e.g., software) that is stored on a machine readable medium and/or may be physically embodied as part of an electrical circuit. In another embodiment, the functions of the electronic controller 26 may be carried out by a control circuit 28 that is responsible for overall operation of the electronic device 10. In this case, the controller 26 may be omitted. In another embodiment, camera assembly 12 control functions may be distributed between the controller 26 and the control circuit 28.

It will be understood that the sensor 16 may generate output image data at a predetermined frame rate to generate a preview video signal that is supplied to the display 22 for operation as an electronic viewfinder. Typically, the display 22 is on an opposite side of the electronic device 10 from the imaging optics 14. In this manner, a user may point the camera assembly 12 in a desired direction and view a representation of the field-of-view of the camera assembly 12 on the display 22. As such, the camera assembly 12 may have a point-of-view, or perspective. The point-of-view is a combination of a location of the camera assembly 12 and a direction in which the camera assembly 12 is aimed by the user. The point-of-view of the camera assembly 12, in combination with characteristics of the imaging optics 14 and optical settings, such as an amount of zoom, establish the field-of-view of the camera assembly.

In one embodiment, the electronic device 10 includes one or more components that may be used to determine the point-of-view of the camera assembly 12 at a given moment in time, such as when the user commands the taking of a picture or is composing a picture while observing the viewfinder. For example, the electronic device 10 may include a position data receiver 29 for use in determining a location of the electronic device 10. The position data receive 28 may be, for example, a global positioning system (GPS) receiver, Galileo satellite system receiver or the like. The location data received by the position data receiver 29 may be processed to derive a location value, such as coordinates expressed using a standard reference system (e.g., the world geodetic system or WGS). Also, assisted-GPS (or A-GPS) may be used to determine the location of the electronic device 10. A-GPS uses an assistance server, which may be implemented with a server of a communications network in which the electronic device 10 operates. The assistance server processes location related data and accesses a reference network to speed location determination and transfer processing tasks from the electronic device 10 to the server. For instance, the assistance server may perform tasks to make range measurements and calculate position solutions that would otherwise be carried out by the position data receiver 29 or elsewhere in the electronic device 10. Location may be determined in other manners. For instance, under global system mobile communications (GSM) and universal mobile telecommunications system (UMTS) protocols, the position could be estimated through a mobile originated location request (MO-LR) to the network so that the electronic device 10 position could be estimated using the network's knowledge of base station locations and antenna directions.

Other components that may generate data that is useful in determining the point-of-view of the camera assembly 12 may be one or more perspective sensors 30 that assist in determining a direction in which the camera assembly 12 is pointed. For example, the perspective sensors 30 may include one or more of a digital compass (also referred to as a magnetometer), a gyroscope and associated logic for tracking tilt of the electronic device 10, an accelerometer and associated logic for tracking movement of the electronic device 10, an altimeter for tracking a height value relative to sea level, etc. In other embodiments, a GPS location determination may include ascertaining altitude information.

The information from the position data receiver 29 and/or perspective sensor(s) may be used to determine a location of the electronic device 10 and a direction in which the camera assembly 12 is pointed. The direction information may include a compass direction (e.g., north, east, west and south, and any direction between these four references) and an elevation (e.g., a positive or negative angle valve with respect to horizontal). Therefore, using a combination of the location information, the direction information and, if desired, the altitude information, the point of the view of the camera assembly 12 may be ascertained.

The electronic device 10 may further include a geographic photo sharing function 32 that, among other tasks, may be configured to determine the point-of-view of the camera assembly 12. Additional details and operation of the geographic photo sharing function 32 will be described in greater detail below. The geographic photo sharing function 32 may be embodied as executable code that is resident in and executed by the electronic device 10. In one embodiment, the geographic photo sharing function 32 may be a program stored on a computer or machine readable medium. The geographic photo sharing function 32 may be a stand-alone software application or form a part of a software application that carries out additional tasks related to the electronic device 10.

Figure 4:
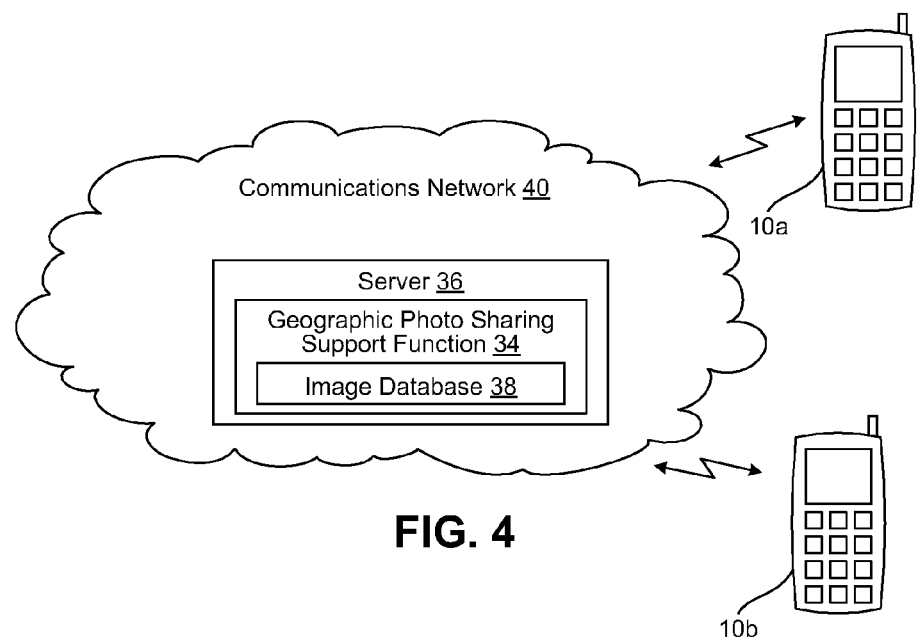
FIG. 4 is a schematic diagram of a communications system in which the electronic device may operate.

With additional reference to FIG. 4, the geographic photo sharing function 32 may use the point-of-view information as part of a way to share photos between two or more electronic devices 10. In one embodiment, the sharing of photos based on point-of-view information may be coordinated by a geographic photo sharing support function 34 that is hosted by a server 36. As described in greater detail below, the photo sharing support function 34 may include an image database 38.

The server 36 may be part of a communications network 40 in which the electronic devices 10 are configured to operate. For instance, the server 36 may manage calls placed by and destined to the electronic devices 10, transmit data to the electronic devices 10 and carry out other support functions. In other embodiments, the server 36 may be outside the domain of the communications network 40, but may accessible by the electronic devices 10 via the communications network 36. Also, each electronic device 10 may be serviced by a separate network. The communications network 40 may include communications towers, access points, base stations or any other transmission medium for supporting wireless communications between the communications network 40 and the electronic devices 10. The network 40 may support the communications activity of multiple electronic devices 10 and other types of end user devices. As will be appreciated, the server 36 may be configured as a typical computer system used to carry out server functions and may include a processor configured to execute software containing logical instructions that embody the functions of the geographic photo sharing support function 34 and a memory to store such software.

Additional details and operation of the geographic photo sharing support function 34 will be described in greater detail below. The geographic photo sharing support function 34 may be embodied as executable code that is resident in and executed by the server 36. In one embodiment, the geographic photo sharing support function 34 may be a program stored on a computer or machine readable medium. The geographic photo sharing support function 34 may be a stand-alone software application or form a part of a software application that carries out additional tasks related to the server 36.

It will be apparent to a person having ordinary skill in the art of computer programming, and specifically in application programming for camera, mobile telephones and/or other electronic devices, how to program the electronic device 10 to operate and carry out logical functions associated with the geographic photo sharing function 32 and how to program the server 36 to operate and carry out logical functions associated with the geographic photo sharing support function 34. Accordingly, details as to specific programming code have been left out for the sake of brevity. Also, while the functions 32 and 34 may be executed by respective processing devices in accordance with an embodiment, such functionality could also be carried out via dedicated hardware or firmware, or some combination of hardware, firmware and/or software.

Also, through the following description, exemplary techniques for sharing and displaying a photo are described. It will be appreciated that through the description of the exemplary techniques, a description of steps that may be carried out in part by executing software is described. The described steps are the foundation from which a programmer of ordinary skill in the art may write code to implement the described functionality. As such, a computer program listing is omitted for the sake of brevity. However, the described steps may be considered an algorithm that the corresponding devices are configured to carry out.

Figure 5:
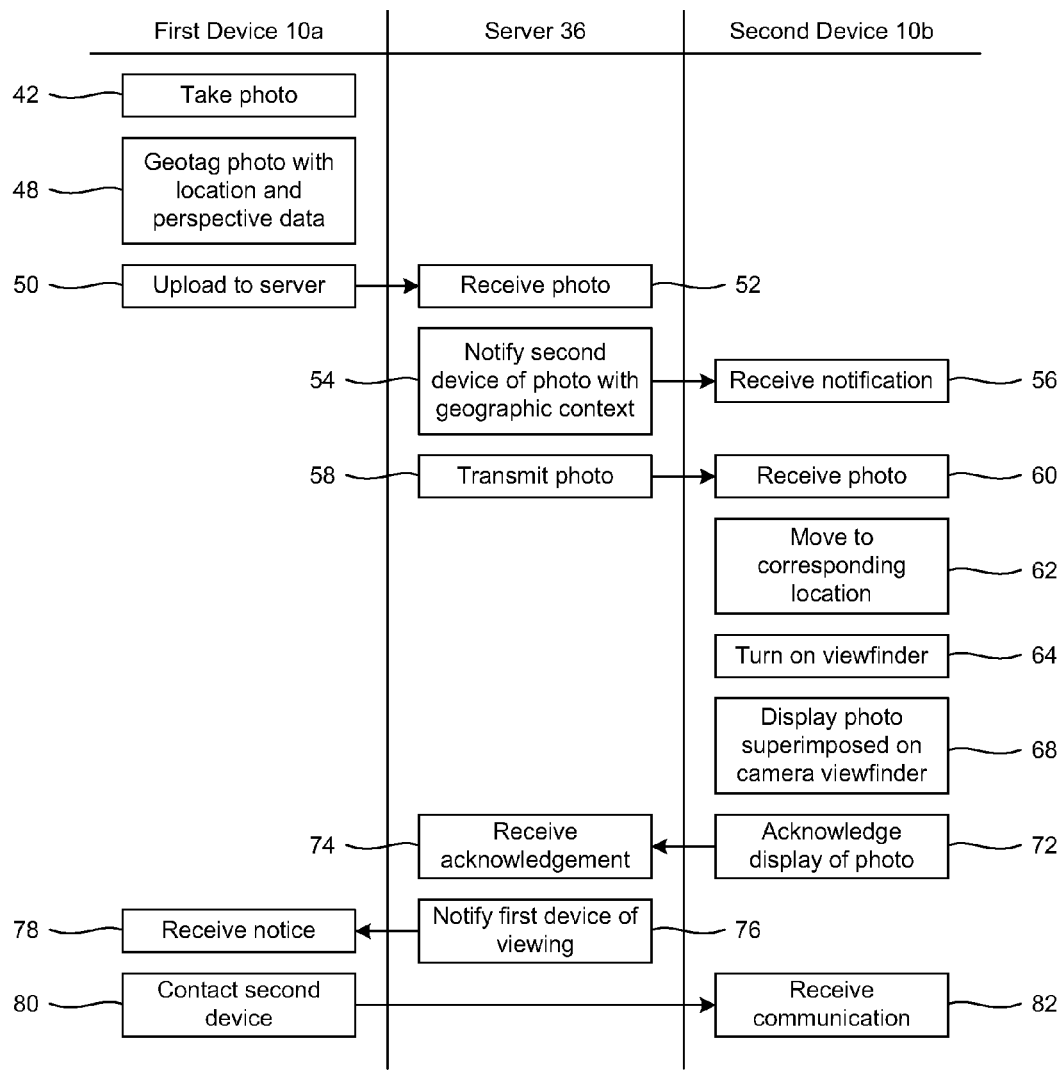
FIG. 5 is a flow diagram of exemplary steps carried out by devices in a representative system for sharing a photo based on relative locations of portable devices in the system.

With additional reference to FIG. 5, illustrated are logical operations to implement an exemplary method of sharing a photo based on respective perspectives of the camera assembly 12 of a first electronic device 10*a* and the camera assembly 12 of a second electronic device 10*b*. The exemplary method may be carried out by executing an embodiment of the geographic photo sharing function 32 with each of the electronic devices 10 and executing an embodiment of the geographic photo sharing support function 34. Thus, the flow chart of FIG. 5 may be thought of as depicting steps of a method carried out by the respective devices, where the steps are described in conjunction with one another to demonstrate a logical flow in accordance with an exemplary sequence of carrying out logical operations for sharing a picture. It will be appreciated that alternative logical flows are possible. Therefore, even though FIG. 5 shows a specific order of executing functional logic blocks, the order of executing the blocks may be changed relative to the order shown. Also, two or more blocks shown in succession may be executed concurrently or with partial concurrence. Certain blocks and/or certain portions of blocks may be omitted.

The logical flow for the photo sharing may begin in block 42 where the user of the first electronic device 10a may take a photo. The photo may be stored in a memory 44 (FIG. 3) of the electronic device 10 as an image file. As part of taking the photo, the user may aim the camera assembly 12 so that the field-of-view of the camera assembly 12 contains a portion of a scene that the user would like to capture in the photo. Next, the user may command the camera assembly 12 to take a picture. For instance, the user may depress a shutter release key, which results in the generation of image data for the picture by the sensor 16.

Figure 6:
FIG. 6 is a representative picture taken with a first electronic device of the system for sharing a photo.

With additional reference to FIG. 6, illustrated is a representative photo 46 taken with the camera assembly 12 of the first electronic device 10a. In the example of FIG. 6, the picture 46 is a picture of a person sitting on a stool that overlooks an inside courtyard of a building.

In block 48, a geotag may be stored with the photo 46, such as in metadata for the photo 46. The geotag may contain point-of-view information, including location data and direction data so as to indicate the position of the camera assembly 12 and the direction in which the camera assembly 12 was aimed at the time that the photo 46 was taken. In addition to the above-described techniques for determining point-of-view, image analysis may be used in the determination of point-of-view information.

In block 50, the user of the first electronic device 10a may upload the photo 46 with the point-of-view information to the server 36. The user may define a set of persons, such as friends, family members, coworkers, etc., that may have access to the photo 46 through the photo sharing techniques described herein. If desired, the user may allow unknown individuals to access the photo 46. In block 52, the server 36 may receive the photo 46 and store the photo 46, the associated point-of-view information and the associated accessibility information in the image database 38.

Next, in blocks 54 and 56, the user of the second electronic device 10b may be notified of the photo. In one embodiment, the notification may occur by action of the user, such as by browsing a map that includes indicators of the locations of where accessible photos were taken. In one embodiment, the photos themselves may not be displayed to the user of the second electronic device 10b. Rather, as described below, the user may view a particular photo by moving to the location at which the photo was taken. Some information, however, may be made available to the user, such as an identity of the person who took the photo, an address at which the photo was taken, a time and date at which the photo was taken, etc. In one embodiment, the user may filter the displayed photo indicators by various search criteria, such as the photographer, a time range, a location range, etc.

In another embodiment, the user of the second electronic device 10b may receive the notice from the server 36 in the form of a transmission. For instance, as the second electronic device 10b approaches a location at which an accessible photo from the image database 38 was taken (e.g., the electronic device 10b comes within a predetermined proximity of the location), the server 36 may transmit a text or audio notification to the second electronic device 10b. To facilitate these steps, the server 36 may track the location of the electronic device 10b relative to the location at which the photo 46 was taken.

The notification may be in the form of a text message or an audio message. As the user gets closer to or further from the location, the server 36 may transmit additional messages to the second electronic device 10b to provide the user with directional cues (e.g., hints or clues) as to how to arrive at the location that the photo was taken. The cues may be directions (e.g., compass directions or directions to advance, retreat, turn left or right, etc.), relative clues (e.g., the words "warm" and "hot" when getting closer to the location and the words "cool" and "cold" when getting further from the location), or some other form of cues. In another approach, the notification may be in the form of 3D positional audio played back through stereo headphones so that the audio may appear to the user to originate from the location of interest. As indicated, these notices and cues may originate from the server 36. In other embodiments, the second electronic device 10b may be notified of the location (e.g., by receipt a data message containing the location or by extracting location information from a received photo) and the second electronic device 10b may generate user notifications, prompts and/or cues to alert the user that he or she is nearing the location.

In blocks 58 and 60, the photo 46 may be transferred to the second electronic device 10b. In one embodiment, transferring of the photo 46 may serve as the notice of blocks 54 and 56.

Figure 7:
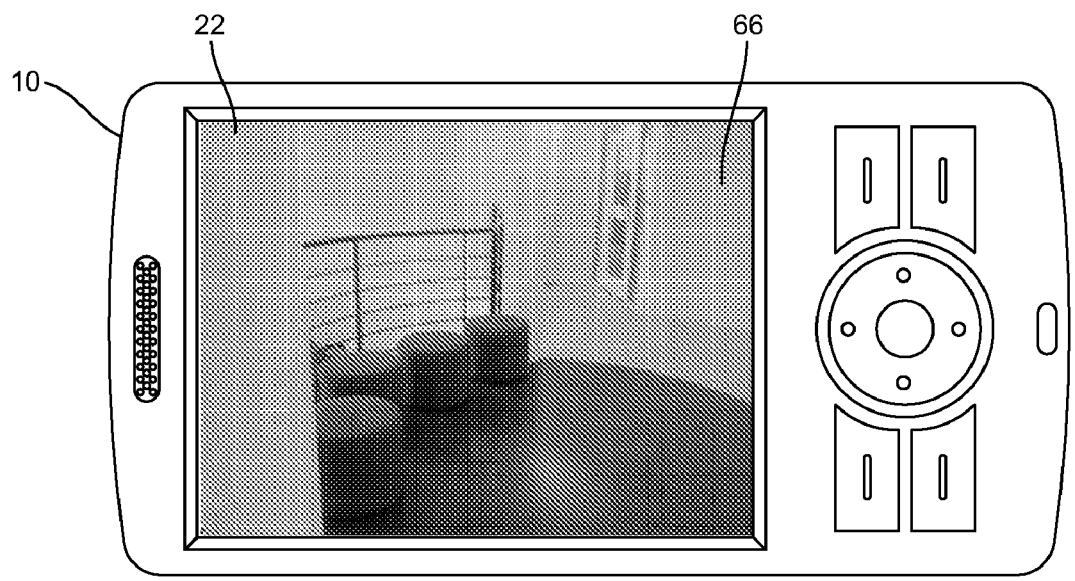
FIGS. 7 through 10 are representative views of a second electronic device of the system for sharing a photo that progressively depict the display of a photo that was taken with the first electronic device.

If not already near the location at which the photo 46 was taken, the user may start to move the electronic device 10 toward the location in block 62. In one embodiment, the sharing of the photo 46 is configured to display the photo 46 as a superimposed image over a preview image displayed on the electronic viewfinder 22 of the electronic device 10. Therefore, in block 64 and as illustrated in FIG. 7, the electronic viewfinder 22 may be turned on to present a preview image 66 to the user of the second electronic device 10b.

Figure 8:
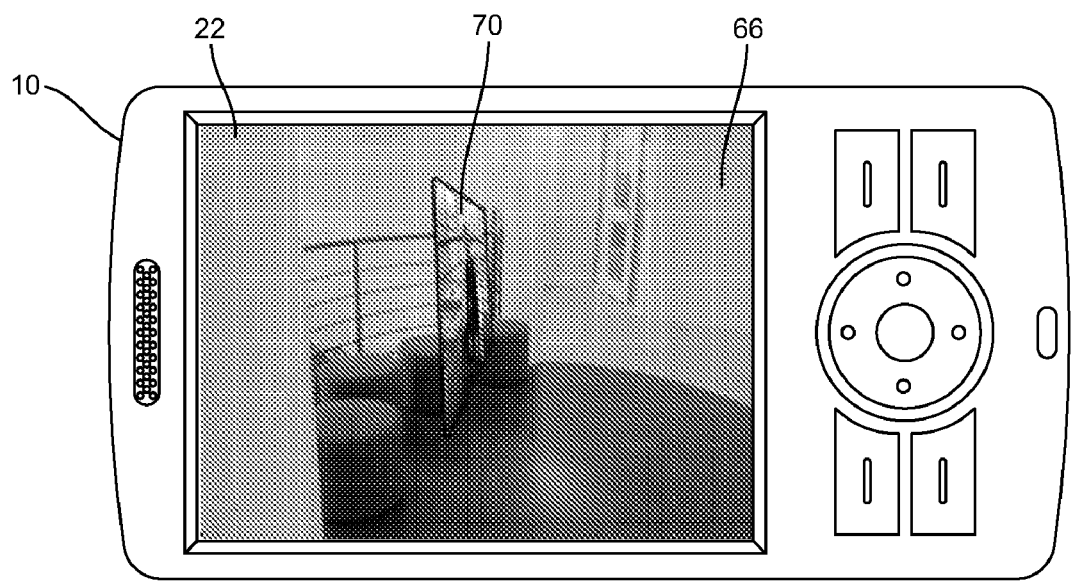

Next, in block 68 and as illustrated in FIG. 8, when the second electronic device 10b comes within a predetermined distance (e.g., less than five meters, less than ten meters, less than fifty meters, or some other distance) from the location at which the photo 46 was taken, the photo 46 may be displayed on the electronic viewfinder 22. The photo may be displayed as a virtual object 70, which also will be referred to as a shared photo 70. In one embodiment, the shared photo 70 may be displayed to form part of the scene represented by the preview image 66. For example, as shown in FIG. 8, when the perspective of the second electronic device 10b does not match the perspective of the first electronic device 10a when the photo 46 was captured, the shared photo 70 may be oriented so as represent the photo 46 in space to have the relative positioning of the scene as captured in the photo 46. In other words, the orientation of the shared photo 70 may be turned relative to the preview image 66 and skewed to have proper perspective as if the shared photo 70 were a physical picture that was "hung" in the field-of-view of the camera assembly 12 of the second electronic device 10b. In this manner, the shared photo 70 is displayed on the viewfinder to visually represent a relative orientation of the scene as captured in the photo 46 versus a current point-of-view of the camera assembly 12 with respect to the scene.

Figure 9:
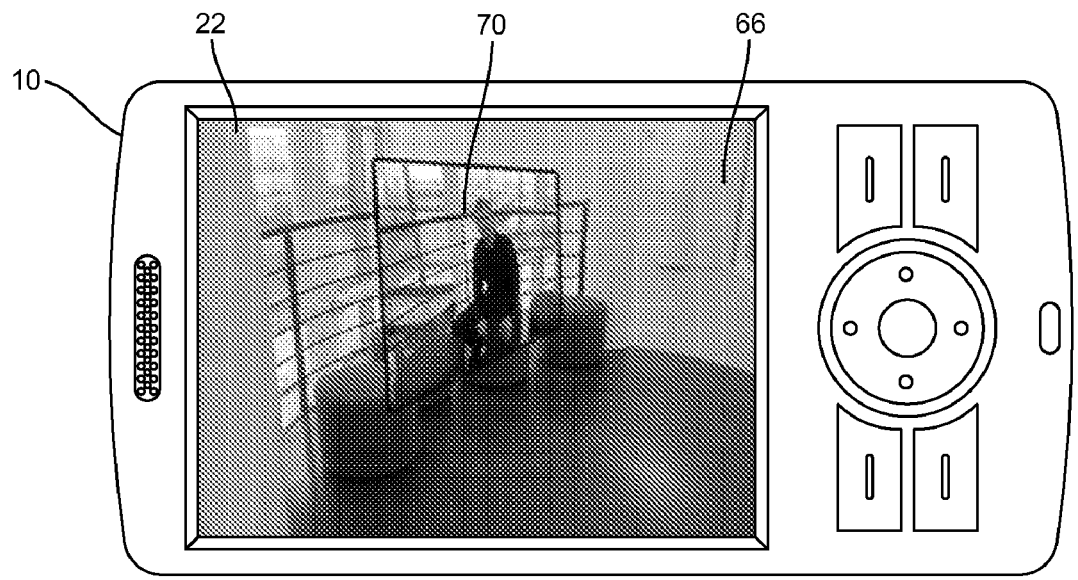
Figure 10:
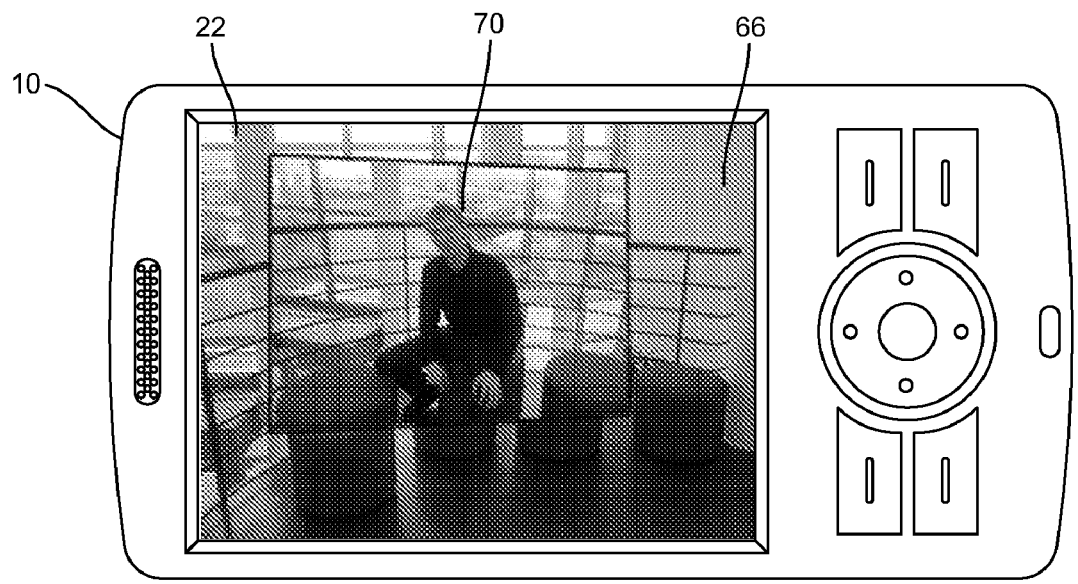

With additional reference to FIGS. 9 and 10, as the user more closely aligns the point-of-view of the camera assembly 12 of the second electronic device 10 with the point-of-view of the camera assembly 12 of the first electronic device 10 when the photo 46 was taken, the corresponding shared photo 70 may be aligned to have corresponding perspective on the electronic viewfinder 22.

In one embodiment, the shared photo 70, as displayed on the electronic viewfinder 22, may be scaled to match the scale (e.g., magnification) of the point-of-view of the camera assembly 12 of the second electronic device 10*b*. Scaling may be accomplished by image analysis to match the size and position of identifiable visual items in the shared photo 70 with the relative position of the same items in the preview image 66. In one embodiment, the shared photo 70 may be surrounded by the preview image 66 as depicted in the appended figures.

The shared photo 70 may be displayed with full color saturation so as to appear to cover the corresponding portion of the scene depicted in the preview image 66. In another embodiment, the shared photo 70 may be displayed with transparency so that the portion of the preview image 66 over which the shared photo 70 is displayed also may be observed in the electronic viewfinder 22.

In other embodiments, the shared photo 70 may be displayed without the display of a preview image 66. For instance, when the location of the second electronic device 10*b* is approximately the same as the location of the first electronic device 10*a* when the photo 46 was taken, the photo 46 may be displayed on the display 22 of the electronic device 10*b*. In other embodiments, the shared photo 70 need not be superimposed over the preview image 66. For instance, the shared photo 70 may be displayed next to the preview image 66 in "split screen" format.

In blocks 72 and 74, the second electronic device 10*b* may acknowledge that the shared photo 70 as displayed. In one embodiment, the acknowledgement may be in the form of a data message that is transmitted to the server 36. In blocks 76 and 78, the server 36 may notify the first device 10*a* that the second device 10*b* displayed a representation of the photo 46. The notice may contain contact information for the second device 10*b* so that the user of the first device 10*a* may initiate a communication to the second device 10*b*. In another embodiment, the acknowledgement of viewing of the photo 46 may be transmitted from the second device 10*b* to the first device 10*a* without involvement of the server 36. To support this embodiment, the transmission of the photo 46 to the second device 10*b* may include transmission of the contact information for the first device 10*a*.

Thereafter, in blocks 80 and 82, the user of the first device 10*a* may initiate a communication with the second device 10*b*. The communication may be in the form of a text message, a multimedia message, an instant message, an electronic mail message, a telephone call, a push-to-talk voice communication, or other form of communication. The communication may allow the respective users to share thoughts and experiences about the sharing of the photo in the above-described manner. In other embodiments, the user of the second electronic device 10*b* may initiate a communication with the first electronic device 10*a* after viewing the photo 46.

As will be appreciated, the second electronic device 10*b* may be considered a browsing device for geotagged pictures that were captured with one or more other electronic devices at a previous point in time. An aspect of the browsing technique includes displaying one or more geotagged pictures on a camera viewfinder 22 of the second electronic device 10*b*. The experience of seeking out a location at which another person took a photo to view the photo provides a unique and interesting experience where the "real world" location of the user in incorporated into the viewing experience. Users may be able to employ the disclosed techniques as part of a game, such as a "scavenger hunt" or "treasure hunt" where the display of a photo provides a clue to a next location to which the user should proceed. Also, the disclosed techniques may trigger communication between the photographer (e.g., the user of the first electronic device 10*a* in the described example) and the viewer of the photo (e.g., the user of the second electronic device 10*b* in the described example).

While the described techniques are described in the exemplary context of still images, the techniques may be modified for use with video images.

Also, the viewfinder 22 on which the shared photo 70 is displayed together with the preview image 66 may form part of the same electronic device 10 that captured the corresponding photo 46. In this way, the electronic device 10 may be used to recall a photo that the user took at relatively the same location at a previous point in time. The photo then may be a reminder of how the scene appeared at that prior point in time and may be compared to how the scene currently appears.

As indicated, the electronic device 10 of the illustrated embodiments is a mobile telephone. Features of the electronic device 10, when implemented as a mobile telephone, will be described with continued reference to FIGS. 1 through 3.

As indicated, the electronic device 10 may include the display 22. The display 22 displays information to a user such as operating state, time, telephone numbers, contact information, various menus, etc., that enable the user to utilize the various features of the electronic device 10. Also, the key and/or buttons 24 may provide for a variety of user input operations, including call operations, messaging operations, Internet browsing, menu navigation, game playing, multimedia content playback and so forth. Although not illustrated, the keys and/or buttons 24 may include alphanumeric character keys.

The electronic device 10 may include call circuitry that enables the electronic device 10 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The electronic device 10 may be configured to transmit, receive and/or process data, such as text messages, instant messages, electronic mail messages, multimedia messages, image files, video files, audio files, ring tones, streaming audio, streaming video, data feeds (including podcasts and really simple syndication (RSS) data feeds), and so forth. Processing data may include storing the data in the memory 44, executing applications to allow user interaction with the data, displaying video and/or image content associated with the data, outputting audio sounds associated with the data, and so forth.

The electronic device 10 may include the primary control circuit 28 that is configured to carry out overall control of the functions and operations of the electronic device 10. The control circuit 28 may include a processing device 84, such as a central processing unit (CPU), microcontroller or microprocessor. The processing device 84 may execute code that implements the various functions of the electronic device 10.

The code may be stored in a memory (not shown) within the control circuit 28 and/or in a separate memory, such as the memory 44, in order to carry out operation of the electronic device 10.

Continuing to refer to FIG. 3, the electronic device 10 includes an antenna 86 coupled to a radio circuit 88. The radio circuit 88 includes a radio frequency transmitter and receiver for transmitting and receiving signals via the antenna 86. The radio circuit 88 may be configured to operate in a mobile communications system and may be used to carryout calls and to send and receive data and/or audiovisual content. Receiver types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMax, digital video broadcasting-handheld (DVB-H), integrated services digital broadcasting (ISDB), etc., as well as advanced versions of these standards. It will be appreciated that the antenna 86 and the radio circuit 88 may represent one or more than one radio transceivers.

The electronic device 10 further includes a sound signal processing circuit 90 for processing audio signals transmitted by and received from the radio circuit 88. Coupled to the sound processing circuit 88 are a speaker 92 and a microphone 94 that enable a user to listen and speak via the electronic device 10 as is conventional. The radio circuit 88 and sound processing circuit 90 are each coupled to the control circuit 28 so as to carry out overall operation. Also, the display 22 may be coupled to the control circuit 28 by a video processing circuit 96 that converts video data to a video signal used to drive the display 22.

The electronic device 10 may further include one or more I/O interface(s) 98. The I/O interface(s) 98 may be in the form of typical mobile telephone I/O interfaces and may include one or more electrical connectors. As is typical, the I/O interface(s) 98 may be used to couple the electronic device 10 to a battery charger to charge a battery of a power supply unit (PSU) 100 within the electronic device 10. In addition, or in the alternative, the I/O interface(s) 98 may serve to connect the electronic device 10 to a headset assembly (e.g., a personal handsfree (PHF) device) that has a wired interface with the electronic device 10. Further, the I/O interface(s) 98 may serve to connect the electronic device 10 to a personal computer or other device via a data cable for the exchange of data. The electronic device 10 may receive operating power via the I/O interface(s) 98 when connected to a vehicle power adapter or an electricity outlet power adapter. The PSU 100 may supply power to operate the electronic device 10 in the absence of an external power source.

Other components that are commonly found in mobile telephones 10 may be present, such as a system clock, a local wireless interface (e.g., an infrared transceiver and/or an RF transceiver, such as a Bluetooth transceiver), etc.

Although certain embodiments have been shown and described, it is understood that equivalents and modifications falling within the scope of the appended claims will occur to others who are skilled in the art upon the reading and understanding of this specification.

What is claimed is:

1. An electronic device, comprising:
    a camera assembly;
    an electronic viewfinder configured to display a preview image representing a portion of a scene that is in a field of view of the camera assembly to a user; and
    a controller configured to control the electronic viewfinder to display a photo together with the preview image, the photo containing a representation of a portion of the scene as captured at a previous point in time and geotagged with a location of the place of capture; and
    wherein the photo is captured with a different camera assembly and transferred to the electronic device;
    wherein the photo is superimposed over the preview image;
    wherein the electronic device is configured to function as a browsing device for the geotagged picture as the electronic device approaches the geotagged location in which the picture was captured by display of the photo when a location of the camera assembly comes within a predetermined distance of the geotagged location at which the photo was captured; and
    wherein the photo is displayed on the viewfinder turned relative to the preview image and skewed to have a perspective to visually represent a relative orientation of the scene as captured in the photo versus a point-of-view of the camera assembly with respect to the scene.

2. The electronic device of claim 1, wherein the photo is displayed with partial transparency.

3. The electronic device of claim 1, further comprising call circuitry for establishing a call over a network.

4. A method of viewing a photo with an electronic device that includes a camera assembly and an electronic viewfinder, comprising:
    displaying a preview image on the electronic viewfinder to a user, the preview image representing a portion of a scene that is in a field of view of the camera assembly; and
    displaying the photo on the electronic viewfinder together with the preview image, the photo containing a representation of a portion of the scene as captured at a previous point in time and geotagged with a location of the place of capture; and
    wherein the photo is captured with a different camera assembly and transferred to the electronic device;
    wherein the photo is superimposed over the preview image;
    further comprising tracking the location of the electronic device relative to a location at which the photo was captured, and wherein the photo is displayed when a location of the camera assembly comes within a predetermined distance of the geotagged location at which the photo was captured; and
    wherein the photo is displayed on the viewfinder turned relative to the preview image and skewed to have a perspective to visually represent a relative orientation of the scene as captured in the photo versus a point-of-view of the camera assembly with respect to the scene.

5. The method of claim 4, further comprising transmitting a notification to alert a user of the different camera assembly that the photo was viewed.

6. The method of claim 4, further comprising receiving a communication from an electronic device associated with a user of the different camera assembly following the display of the photo.

7. The method of claim 4, further comprising initiating a communication with an electronic device associated with a user of the different camera assembly following the display of the photo.

8. The method of claim 4, wherein the photo is displayed with partial transparency.

9. The method of claim 4, wherein the photo is made available to the electronic device by a user of another electronic device.

10. The method of claim 9, further comprising browsing a map that identifies locations of available photos, and wherein the location at which the photo was captured is a user selected one of the locations.

11. The method of claim 9, further comprising receiving a notification that the electronic device is within a predetermined proximity to the location at which the photo was captured.

12. The method of claim 4, further comprising outputting cues to the user to assist the user in moving to the location at which the photo was captured.

* * * * *